June 14, 1932.  L. C. HARDESTY  1,863,403
MOTOR CONTROL SYSTEM
Filed Nov. 24, 1928
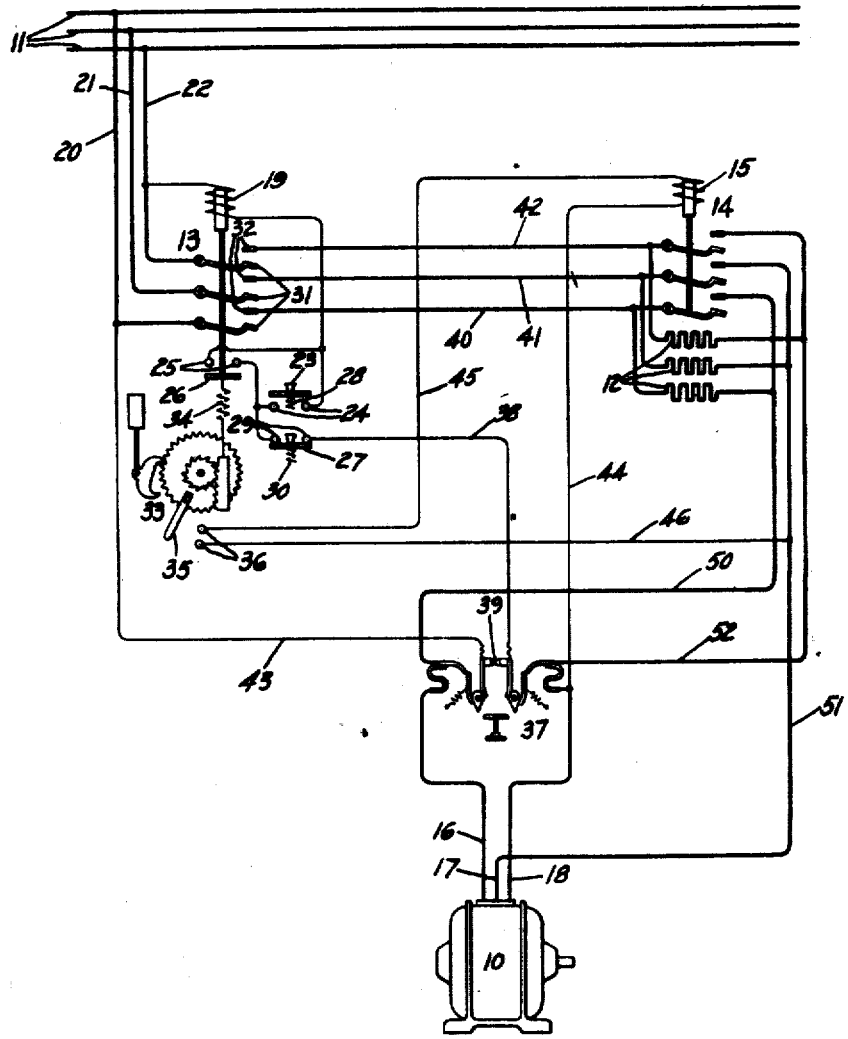
Inventor:
Llewellyn C. Hardesty,
by Charles V. Tullar
His Attorney.

Patented June 14, 1932

1,863,403

UNITED STATES PATENT OFFICE

LLEWELLYN C. HARDESTY, OF SCOTIA, NEW YORK, ASSIGNOR TO GENERAL ELECTRIC COMPANY, A CORPORATION OF NEW YORK

MOTOR CONTROL SYSTEM

Application filed November 24, 1928. Serial No. 321,715.

My invention relates to controllers for electric motors and more particularly to controllers for starting alternating current motors in which the arrangement is such that the motor is first connected to the supply circuit through a resistance or other suitable voltage reducing device and is then connected directly with the line after it has accelerated to a predetermined speed.

An object of my invention is the provision of a simple and inexpensive starting device whereby the motor may be started and brought up to its running speed in a safe, reliable and efficient manner.

In a particular embodiment of my invention I employ a line contactor to start the motor by connecting the terminals of the motor with the line through a suitable resistance, and a "running" contactor connected to be energized in accordance with the counter E. M. F. of the motor to short circuit the resistance and connect the motor directly with the line after it has come up to speed together with a time element means for preventing the operation of the running contactor for a definite time interval after the operation of the line contactor.

A further object of the invention is to insure that the "running" contactor will not close and short circuit the resistance and supply full line voltage to the terminals until the motor has come up to a predetermined speed. Further and ancillary objects of the invention will manifest themselves to those skilled in the art from the detailed description and explanation which follows.

For a better understanding of my invention reference should be had to the following specification together with the accompanying drawing, the single figure of which is a diagrammatical representation of an embodiment of my invention.

Referring now to the drawing, I have shown my invention in one form as applied to an alternating current motor 10 adapted to be connected with a source of electric power which for the purposes of illustration I have shown as a three phase source represented by the three supply lines 11. In order that full line voltage shall not be applied to the terminals of the motor during the starting operation until the speed of the motor has reached a predetermined value, a voltage reducing device comprising the three resistors 12 is provided. A line contactor 13 serves, when operated to closed position, to connect the terminals of the motor 10 with the supply line 11 through the resistors 12. "Running" connection between the motor and the supply line in which the resistors 12 are short circuited and full line voltage is applied to the terminals of the motor, is established by the closing of "running" contactor 14. The energizing coil 15 of the contactor 14 is supplied from the terminals 17 and 18 of one phase of the motor 10 and this coil is so designed that it will not close the "running" contactor 14 until the terminal voltage of the motor has reached a predetermined value. The energizing coil 19 of the line contactor 14 is adapted to be connected with one phase of the three phase source of supply 11 through the conductors 20 and 22 and the movable and stationary contacts 23 and 24 of the "starting" button. Starting button 23, which I have shown as a push button type of contactor, normally biased to the open position by the spring 28 but which may be any suitable type of contact making device, is provided to bridge the stationary contacts 24 when depressed momentarily, and to energize the coil 19 and initiate the starting operation. Auxiliary contacts 25 on the contactor 13 are adapted to be bridged by the bridging member 26 when the contactor 13 is moved to closed position thereby to establish a self-holding circuit for the energizing coil 19. A "stop" button 27 normally biased to the closed position by the spring 30 to bridge the stationary contact members 29 serves when temporarily depressed to open the circuit of the energizing coil 19 to initiate the stopping operation.

Those skilled in the art will understand that at the instant that the tips 31 of the line contactor 13 engage the stationary contact members 32 and before the current through the resistors 12 has built up to an appreciable value, full line voltage will be impressed upon the motor terminals. If energizing coil 15, which is set for a voltage lower than the full line voltage, were connected directly across the terminals of the motor at this instant when full line voltage exists at the motor terminals, running contactor 14 would be actuated to the closed position and the resistors 12 would be short circuited. In this condition an excessive voltage would be maintained at the motor terminals and an excessive current would be caused to flow in the windings until the motor accelerated sufficiently to reduce the current to normal value. This condition would be abusive of the apparatus and might even result in serious damage to the apparatus. To prevent such an occurrence, a definite time delay device 33 is provided the function of which is to delay the energization of the coil 15 for a period of time after the operation of line contactor 13 to permit the current to build up in resistors 12 and reduce the voltage at the motor terminals to a value lower than that for which relay 15 is set to operate. Although any suitable type of time delay device may be used, I prefer to use the type shown in the drawing which is described and claimed in copending application Serial No. 161,919— Robert W. Goff, filed January 18, 1927. The coil 15 is connected across the terminals of the motor in a circuit that is normally open at the stationary contacts 36. A spring 34, which is placed under tension by the closing operation of contactor 13 sets the time delay device 33 into operation and causes the contactor 35 to bridge the contacts 36 at the expiration of a definite interval of time. After the closing of line contactor 13 suitable protection against overload is afforded by an overload protective device which is illustrated in the drawing as an overload temperature relay 37.

The starting operation proceeds in an extremely simple and straight forward manner. As shown in the drawing the apparatus is in its normal or pre-starting position with both the line contactor and the "running" contactor in their open circuit positions. To start the motor the button 23 is momentarily depressed to bridge the stationary contacts 24 and establish connections between energizing coil 19 and the source of supply over a circuit that may be traced from one side of the source of supply 11, conductor 22, energizing coil 19, bridging member 23 and stationary contacts 24, bridging member 27 and stationary contacts 29 of the "stopping" button, conductor 38, contacts 39 of the overload temperature relay, conductor 43 to conductor 20 and an opposite side of the source of supply 11. Line contactor 13 now closes and connects the terminals of the motor 10 with the source of supply 11 through the voltage reducing resistors 12 over the following circuit: Conductors 20, 21, and 22, conductors 40, 41, and 42, resistors 12, conductors 50, 51, and 52, and terminals 16, 17, and 18 of the motor 10. Those skilled in the art will understand that as a result of the closing of line contactor 13 that full line voltage will exist momentarily at the terminals of the motor 10. However, as the current builds up in the resistors 12 and the voltage drop across the resistors increases, the voltage at the motor terminals becomes reduced to a value considerably lower than the line voltage and the motor will be accelerated from rest to a speed that is proportional to the applied voltage. Contactor 13 in closing, causes bridging member 26 to bridge the auxiliary contacts 25 and short circuit the stationary contacts 24 of the starting button to establish a self-holding circuit for energizing coil 19. In closing, contactor 13 also places spring 34 under tension and causes the time relay device 33 to actuate the movable contactor 35 in a counterclockwise direction and after a definite time interval to bridge the stationary contacts 36 thereby to establish a circuit for energizing coil 15 that extends from motor terminal 18 over conductor 44 through coil 15, conductor 45, stationary contacts 36, and contact 35, conductor 46, and conductor 51 to an opposite terminal 17 of the motor.

When the motor has accelerated sufficiently and its counter-voltage has built up to the value for which the coil 15 is set to operate, "running" contactor 14 will close its contacts short circuiting the resistors 12 and connecting the motor terminals directly with the line. As a result of this operation full line voltage will be applied to the terminals of the motor 10 and it will be accelerated to full running speed. It will have been observed that at the instant that the tips of line contactor 13 were moved into engagement with the stationary contacts 32, the circuit of the energizing coil 15 was open at the contacts 36. And it will be understood that the current flowing through resistors 12 will have had sufficient opportunity to build up and reduce the voltage at the terminals of the motor 10 before the definite time delay device 33 has had sufficient time to complete its operation and cause the contacts 36 to be bridged and the energizing coil 15 to be connected to the motor terminals. Thus, it will be seen that "running" contactor 14 can not close its contacts until the motor has reached the speed for the corresponding voltage of which the energizing coil 15 is set to operate.

To stop the motor the stopping button 27 is momentarily depressed and the circuit of the energizing coil 19 is opened at the stationary contacts 29. As a result of this, all contactors open and the motor terminals are disconnected from the line. When line contactor 13 opens, the tension on the spring 34 is relieved and the time delay device 33 is returned to its pre-starting position with the contactor 35 out of engagement with the stationary contacts 36.

Although I have described my invention as embodied in concrete form and as operating in a specific manner in accordance with the provisons of the patent statutes, I would have it understood that I do not limit my invention thereto, for various modifications thereof will readily suggest themselves to those skilled in the art without departing from the spirit of my invention or the scope of the annexed claims.

What I claim as new and desire to secure by Letters Patent of the United States, is:

1. In combination with an electric motor, a current limiting device, a line contactor, manually operated means for operating said line contactor to supply current to said motor through said current limiting device, a running contactor for short circuiting said current limiting device, means including a coil for responding to a predetermined counter voltage of said motor to operate said running contactor, and a time delay device set in operation responsively to the operation of said line contactor for connecting said coil to the terminals of said motor a predetermined interval of time after the operation of said line contactor.

2. In combination with an electric motor, a starting device for said motor comprising a resistance device, a line contactor for connecting the terminals of said motor to a source of supply through said resistance device, operating means for said line contactor including an electroresponsive device connected across the line in a normally open circuit and manually operated means for closing said normally open circuit, a running contactor for short circuiting said resistance device and means for operating said running contactor comprising a coil for responding to a predetermined motor voltage connected in a normally open circuit across the motor terminals, and a time delay device operable in response to operation of the line contactor for closing said last mentioned normally open circuit a definite interval of time after the operation of the line contactor.

In witness whereof, I have hereunto set my hand this 23rd day of November, 1928.

LLEWELLYN C. HARDESTY.